United States Patent
Kim et al.

(10) Patent No.: US 9,612,789 B2
(45) Date of Patent: Apr. 4, 2017

(54) DISPLAY APPARATUS, DISPLAY SYSTEM HAVING THE SAME, AND METHOD FOR SETTING ID THEREOF

(71) Applicant: SAMSUNG ELECTRONICS CO., LTD., Suwon-si (KR)

(72) Inventors: Ju-yong Kim, Suwon-si (KR); Koung-oh Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 14/588,609

(22) Filed: Jan. 2, 2015

(65) Prior Publication Data

US 2015/0213745 A1    Jul. 30, 2015

(30) Foreign Application Priority Data

Jan. 27, 2014  (KR) ........................ 10-2014-0009390

(51) Int. Cl.
  *G06F 3/14*  (2006.01)
(52) U.S. Cl.
  CPC ..... *G06F 3/1446* (2013.01); *G09G 2300/026* (2013.01); *G09G 2370/04* (2013.01)
(58) Field of Classification Search
  CPC .............................. G06F 3/1446; G06F 3/1423
  See application file for complete search history.

(56) References Cited

U.S. PATENT DOCUMENTS

| | | | | |
|---|---|---|---|---|
| 7,986,282 B2* | 7/2011 | Zerphy | ................. | G06F 3/1431 345/1.3 |
| 9,069,519 B1* | 6/2015 | Hall | ...................... | G06F 3/1446 |
| 2008/0163195 A1* | 7/2008 | Kang | ........................ | G06F 3/14 717/174 |
| 2010/0253691 A1* | 10/2010 | Lin | ....................... | G06F 3/1431 345/520 |
| 2010/0262725 A1* | 10/2010 | Ikeda | ........................ | G06F 3/14 710/15 |
| 2010/0292004 A1* | 11/2010 | Tokita | ..................... | A63F 13/06 463/32 |
| 2011/0001687 A1* | 1/2011 | Srinivasan | ............ | G06F 3/1431 345/3.1 |
| 2011/0267328 A1* | 11/2011 | Venkatasubramanian | ................. | G06F 3/1431;345/211 |
| 2012/0099029 A1* | 4/2012 | Nejat | .................... | G06F 3/1431 348/840 |
| 2012/0311493 A1* | 12/2012 | Sohn | ................. | H04M 1/72547 715/808 |

(Continued)

*Primary Examiner* — Ricardo L Osorio
(74) *Attorney, Agent, or Firm* — Sughrue Mion, PLLC

(57) ABSTRACT

A display apparatus, a display system having the same, and a method for setting an ID thereof are provided. The method for setting an ID of a display system including a plurality of display apparatuses includes: determining, by a first display apparatus from among the plurality of display apparatuses, whether a second display apparatus from among the plurality of display apparatuses is connected thereto; in response to determining that the second display apparatus is connected thereto, determining, by the first display apparatus, an ID of the second display apparatus based on a set ID of the first display apparatus; and transmitting, from the first display apparatus to the second display apparatus, an ID setting command including the determined ID of the second display apparatus.

19 Claims, 7 Drawing Sheets

(56) References Cited

U.S. PATENT DOCUMENTS

| | | | | |
|---|---|---|---|---|
| 2012/0331200 A1* | 12/2012 | Smith | .................. | G06F 1/1632 |
| | | | | 710/303 |
| 2014/0002327 A1* | 1/2014 | Toren | .................. | G06F 3/1423 |
| | | | | 345/1.1 |
| 2014/0101577 A1* | 4/2014 | Kwak | .................. | G06F 1/1618 |
| | | | | 715/761 |
| 2015/0205616 A1* | 7/2015 | Thai | ....................... | G06F 9/463 |
| | | | | 345/542 |

* cited by examiner

DISPLAY APPARATUS, DISPLAY SYSTEM HAVING THE SAME, AND METHOD FOR SETTING ID THEREOF

CROSS-REFERENCE TO RELATED APPLICATION

This application claims priority from Korean Patent Application No. 10-2014-0009390, filed in the Korean Intellectual Property Office on Jan. 27, 2014, the disclosure of which is incorporated herein by reference in its entirety.

BACKGROUND

1. Field

Apparatuses and methods consistent with exemplary embodiments relate to a display apparatus, a display system including the same, and a method for setting an identifier (ID) thereof, and more particularly, to a display apparatus which sets an ID of each of a plurality of display apparatuses included in a display system, a display system including the same, and a method for setting an ID thereof.

2. Description of the Related Art

Recently, a display system including a plurality of display apparatuses (for example, a video wall) has been used in order to provide information to many people in a public setting, such as an airport, a department store, etc.

In such a display system, a plurality of display apparatuses operate as one display screen and thus, the image of each display apparatus should be displayed with the same image quality. However, there might be some variations in image quality in the display panels due to the respective manufacturing processes or default settings thereof. Accordingly, after all of the display apparatuses are connected, a user may need to adjust the image quality settings of each of the display apparatuses.

In order to adjust the image quality settings of each of the display apparatuses, an identifier (ID) should be set for each of the display apparatuses.

In a related art, in order to set an ID for each of the display apparatuses, a user sets an ID directly by using a control device such as a remote controller or by using an ID setting program of a host device such as personal computer (PC).

As a result, the user experiences inconvenience since a user is to set IDs directly with respect to a plurality of display apparatuses, or by using a separate device such as a host device.

SUMMARY

Aspects of one or more exemplary embodiments relate to a display apparatus that is capable of setting an ID for each of a plurality of display apparatuses more easily and conveniently without a host device, a display system having the same, and a method for setting an ID thereof.

According to an aspect of an exemplary embodiment, there is provided a method for setting an ID of a display system including a plurality of display apparatuses, the method including: determining, by a first display apparatus from among the plurality of display apparatuses, whether a second display apparatus from among the plurality of display apparatuses is connected to the first display apparatus; in response to determining that the second display apparatus is connected to the first display apparatus, determining, by the first display apparatus, an ID of the second display apparatus based on a set ID of the first display apparatus; and transmitting, from the first display apparatus to the second display apparatus, an ID setting command including the determined ID of the second display apparatus.

The first display apparatus and the second display apparatus may be connected via a communication cable, and the communication cable may include a General-purpose input/output (GPIO) terminal which determines a receiver (Rx) terminal, a transmission (Tx) terminal, and a connection state.

The determining may include determining whether the second display apparatus is connected to the first display apparatus using a change in a voltage level of the GPIO terminal.

The transmitting may include transmitting, by the first display apparatus, the ID setting command using a transmission (Tx) terminal of the communication cable.

The method may include setting, by the second display apparatus, the ID based on the ID setting command, and transmitting, by the second display apparatus, a result of the setting to the first display apparatus using a transmission (Tx) terminal of the communication cable.

The communication cable may be one of an RS 232 cable and an RJ 45 cable.

According to an aspect of another exemplary embodiment, there is provided a display apparatus including: a storage configured to store ID information of the display apparatus; a communicator configured to perform communication with another display apparatus; and a controller configured to, in response to determining that the other display apparatus is connected through the communicator, control the communicator to determine an ID of the other display apparatus based on the stored ID information of the display apparatus, and to transmit, to the other display apparatus, an ID setting command including the determined ID of the other display apparatus.

The communicator may perform communication between the display apparatus and the other display apparatus via a communication cable, and the communication cable may include a General-purpose input/output (GPIO) terminal which determines a receiver (Rx) terminal, a transmission (Tx) terminal, and a connection state.

The controller may determine a connection state between the display apparatus and the other display apparatus using a change in a voltage level of the GPIO terminal.

The controller may control the communicator to transmit the ID setting command using the transmission (Tx) terminal of the communication cable.

The communicator, in response to the other display apparatus setting the ID based on the ID setting command, may receive a result of the setting using the receiver (Rx) terminal of the communication cable from the other display apparatus.

The communication cable may be one of an RS 232 cable and an RJ 45 cable.

According to an aspect of another exemplary embodiment, there is provided a display system including: a first display apparatus configured to determine a connection state with respect to a second display apparatus, in response to determining that the second display apparatus is connected, determined ID information of the second display apparatus based on predetermined ID information, and to transmit an ID setting command including the determined ID information of the second display apparatus to the second display apparatus; and a second display apparatus configured to set an ID based on the transmitted ID setting command.

The first display apparatus and the second display apparatus may be connected via a communication cable, and the communication cable may be one of an RS 232 cable and an RJ 45 cable.

According to an aspect of another exemplary embodiment, there is provided a method of setting an ID for a display system including a plurality of display apparatuses, the method including: receiving, by a first display apparatus among the plurality of display apparatuses of the display system, ID information for the first display apparatus from a third display apparatus among the plurality of display apparatuses; setting, by the first display apparatus, an ID of the first display apparatus using the received ID information; and in response to determining that a second display apparatus is connected to the first display apparatus, transmitting, by the first display apparatus to the second display apparatus, an ID setting command for the second display apparatus based on the set ID for the first display apparatus.

BRIEF DESCRIPTION OF THE DRAWINGS

The above and/or other aspects will be more apparent by describing exemplary embodiments with reference to the accompanying drawings, in which.

DETAILED DESCRIPTION OF EXEMPLARY EMBODIMENTS

It is understood that the method operations and system components have been represented by symbols in the figure, showing only specific details which are relevant for an understanding of exemplary embodiments. Further, details that are readily apparent to persons ordinarily skilled in the art may not be explicitly disclosed herein. In the present disclosure, relational terms such as first and second, and the like, may be used to distinguish one entity from another entity, without necessarily implying any actual relationship or order between such entities.

Figure 1:
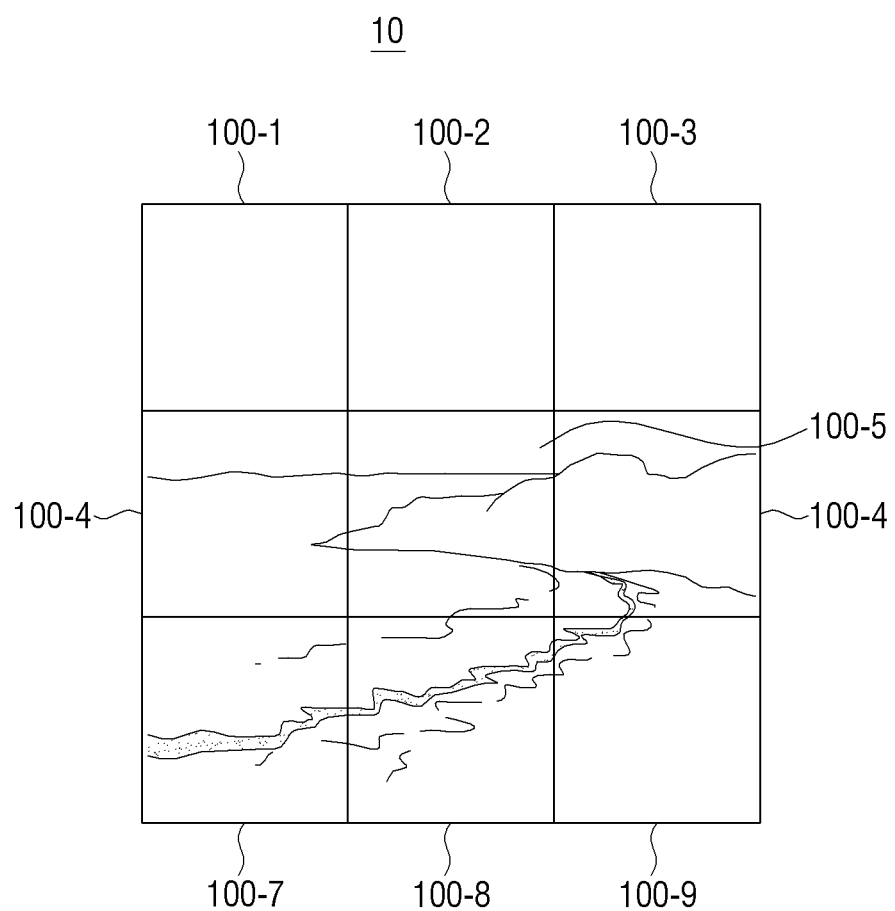
FIG. 1 is a view illustrating a display system according to an exemplary embodiment.

FIG. 1 is a view illustrating a display system 10 according to an exemplary embodiment. The display system 10 includes a plurality of display apparatuses 100-1 to 100-9. In this case, the display system 10 may be realized as a video wall, but this is only an example and it is understood that one or more other exemplary embodiments are not limited thereto. That is, the display system 10 may be realized as various display systems that display one image using a plurality of display apparatuses. Meanwhile, the plurality of display apparatuses 100-1 to 100-9 included in the display system 10 may be connected in the form of loop out.

The plurality of display apparatuses 100-1 to 100-9 display an image input from an external device (for example, a host device). In particular, the plurality of display apparatuses 100-1 to 100-9 may divide and display an input image as illustrated in FIG. 1.

In this case, the plurality of display apparatuses 100-1 to 100-9 should have the same image quality setting in order to display one image. If the plurality of display apparatuses 100-1 to 100-9 have different image quality settings, a viewer of the display system 10 may more likely experience eye fatigue. Accordingly, in order to set the same image quality for the plurality of display apparatuses 100-1 to 100-9, the image quality setting of each of the plurality of display apparatuses 100-1 to 100-9 is to be adjusted. However, in order to adjust the image quality setting of each display apparatus, the plurality of display apparatuses 100-1 to 100-9 should have their own identifiers (IDs).

Hereinafter, an ID setting method of the plurality of display apparatuses 100-1 to 100-9 will be explained with reference to FIGS. 2 and 3.

Figure 2:
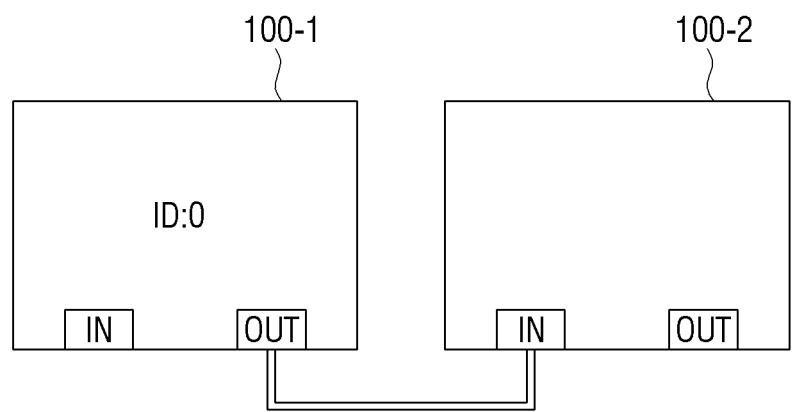
FIGS. 2 and 3 are views provided to explain a method for setting an ID for each of a plurality of display apparatuses by a display system according to an exemplary embodiment.
Figure 3:
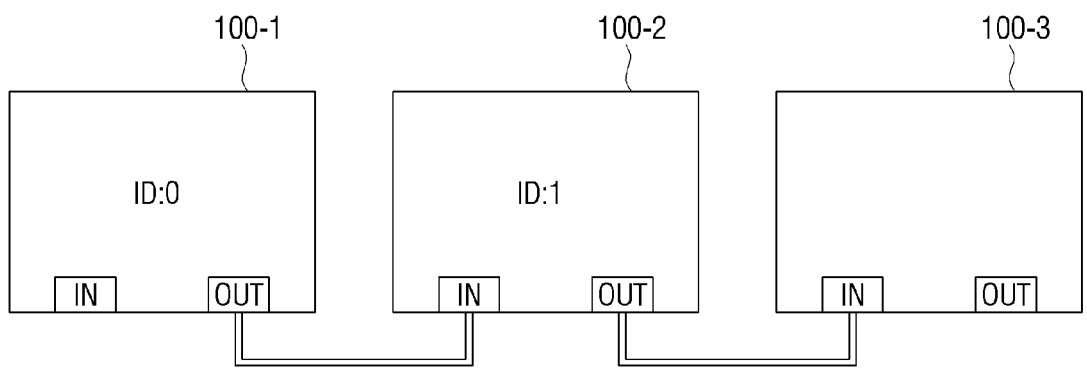

Referring to FIGS. 2 and 3, a first display apparatus 100-1 stores a pre-set ID. For example, the pre-set ID may be "0" as illustrated in FIG. 2.

Additionally, the first display apparatus 100-1 performs a communication connection with a second display apparatus 100-2. In this case, the first display apparatus 100-1 and the second display apparatus 100-2 may be connected through a communication cable (for example, a radio sector (RS) 232 cable, a registered jack (RJ) cable (e.g., RJ45), a High-Definition Multimedia Interface (HDMI) cable, a network cable, a universal serial bus (USB) cable, etc.) Specifically, as illustrated in FIG. 2, a communication between the first display apparatus 100-1 and the second display apparatus 100-2 may be performed via a communication cable connecting an output terminal of the first display apparatus 100-1 and an input terminal of the second display apparatus 100-2.

In this case, the first display apparatus 100-1 may determine a communication connection state using a General-purpose input/output (GPIO) terminal of the communication cable. Specifically, in response to the first display apparatus 100-1 and the second display apparatus 100-2 being connected through a communication cable, the second display apparatus 100-2 may determine the connection with the first display apparatus 100-1 based on a change in the voltage level of the GPIO terminal. For example, if the voltage level of the GPIO terminal is 10V, it may be determined that the second display apparatus 100-2 is not connected to the first display apparatus 100-1. Meanwhile, if the voltage level of the GPIO terminal changes to 0V, it may be determined that the second display apparatus 100-2 is connected to the first display apparatus 100-1. In addition, if it is determined that the first display apparatus 100-1 is connected, the second display apparatus 100-2 may transmit information regarding the communication connection to the first display apparatus 100-1. Based on the information transmitted from the second display apparatus 100-2, the first display apparatus 100-1 may determine the communication connection between the first display apparatus 100-1 and the second display apparatus 100-2.

While in the above-described exemplary embodiment, the second display apparatus 100-2 determines a communication connection state based on whether there is a change in the voltage level of the GPIO terminal and transmits the information to the first display apparatus 100-1, it is understood that one or more other exemplary embodiments are not limited thereto. For example, according to another exemplary embodiment, the first display apparatus 100-1 may determine a communication connection state directly by determining whether there is a change in the voltage level of the GPIO terminal. Furthermore, according to still another exemplary embodiment, a user may enter, in one or more of the display apparatuses 100-1 and 100-2 the communication connection state.

If it is determined that the first display apparatus 100-1 is connected to the second display apparatus 100-2, the first display apparatus 100-1 may generate (e.g., determine, calculate, or obtain) an ID of the second display apparatus 100-2 based on a pre-stored ID. In this case, if the ID is a number, the first display apparatus 100-1 may generate an ID of the second display apparatus 100-2 by adding a predetermined value (for example, '1') to the pre-stored ID. For example, as illustrated in FIG. 2, if the ID of the first display apparatus 100-1 is '0', the first display apparatus 100-1 may generate '1' as the ID of the second display apparatus 100-2 by adding '1' to the ID of the first display apparatus 100-1.

Subsequently, the first display apparatus 100-1 may transmit an ID setting command including ID information of the second display apparatus 100-2 to the second display apparatus 100-2. The second display apparatus 100-2 may store its ID based on the ID information of the second display apparatus 100-2 included in the ID setting command. In this regard, the ID information included in the ID setting command may be the generated ID of the second display apparatus 100-2 or information from which the ID of the second display apparatus 100-2 may be determined (e.g., the ID of the first display apparatus from which the second display apparatus 100-2 would be able to determine its own ID by adding a predetermined number or converting the ID of the first display apparatus 100-1 in a predetermined manner).

In addition, as illustrated in FIG. 3, the second display apparatus 100-2 and a third display apparatus 100-3 may be connected to each other via a communication cable. That is, a communication between the second display apparatus 100-2 and the third display apparatus 100-3 may be performed via a communication cable connecting an output terminal of the second display apparatus 100-2 and an input terminal of the third display apparatus 100-3.

If the third display apparatus 100-3 is connected to the second display apparatus 100-2 via a communication cable, the second display apparatus 100-2 may determine a communication connection with the third display apparatus 100-3 using a change in the voltage level of the GPIO terminal of the communication cable as described above.

If it is determined that the second display apparatus 100-2 is connected to the third display apparatus 100-3, the second display apparatus 100-2 may generate an ID of the third display apparatus 100-3 based on pre-stored ID. In this case, the second display apparatus 100-2 may generate an ID of the third display apparatus 100-3 by adding a predetermined value (for example, '1') to the pre-stored ID. For example, as illustrated in FIG. 3, if the ID of the second display apparatus 100-2 is '1', the second display apparatus 100-2 may generate '2' as the ID of the third display apparatus 100-3 by adding '1' to the ID of the second display apparatus 100-2.

Subsequently, the second display apparatus 100-2 may transmit an ID setting command including the generated ID information of the third display apparatus 100-3 to the third display apparatus 100-3. The third display apparatus 100-3 may store its ID based on the ID information of the third display apparatus 100-3 included in the ID setting command.

As described above, the third display apparatus 100-3 may set an ID of the fourth display apparatus 100-4, the fourth display apparatus 100-4 may set an ID of the fifth display apparatus 100-5, the fifth display apparatus 100-5 may set an ID of the sixth display apparatus 100-6, the sixth display apparatus 100-6 may set an ID of the seventh display apparatus 100-7, the seventh display apparatus 100-7 may set an eighth display apparatus 100-8, and the eighth display apparatus 100-8 may set an ID of the ninth display apparatus 100-9. Accordingly, the first to the ninth display apparatuses 100-1 to 100-9 may be given the IDs of '0'~'8' through a communication cable connection between the first to the ninth display apparatuses 100-1 to 100-9. That is, a user may set an ID of each of the plurality of display apparatuses 100-1 to 100-4 conveniently without any separate manipulation. Furthermore, each display apparatus 100-1 to 100-9 may receive the set IDs of the other display apparatuses 100-1 to 100-9 in the display system. For example, each display apparatus 100-1 to 100-9 may receive the set IDs from a directly adjacent display apparatus.

Figure 4:
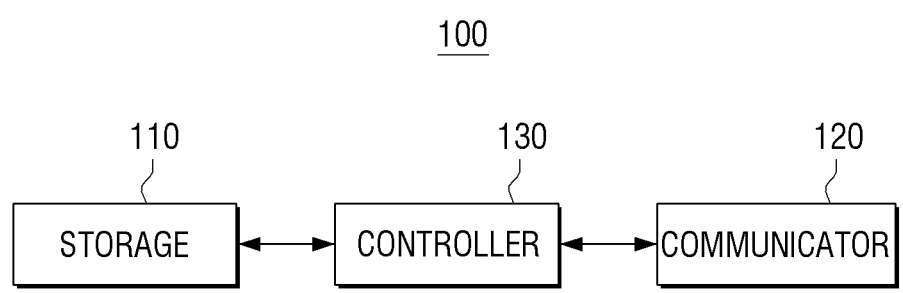
FIG. 4 is a block diagram illustrating a configuration of a display apparatus according to an exemplary embodiment.

FIG. 4 is a block diagram illustrating a configuration of a display apparatus 100 according to an exemplary embodiment. As illustrated in FIG. 4, the display apparatus 100 includes a storage 110, a communicator 120, and a controller 130. Furthermore, the display apparatus may be implemented as a cathode ray tube (CRT) display, a liquid crystal display (LCD), an organic light emitting diode (OLED) display, an active-matrix OLED (AMOLED) display, a light emitting diode (LED) display, a plasma display, etc.

The storage 110 stores various data and programs to operate the display apparatus 100. In particular, the storage 110 may set ID information set by a user or an external display apparatus 100.

The communicator 120 may perform communication with an external apparatus (for example, a host device or other display apparatuses). In this case, the communicator 120 may perform communication with another display apparatus through a communication cable. Herein, the communication cable may be realized as an RS 232 communication cable including a GPIO terminal which determines a receiver (Rx) terminal (e.g., pin), a transmission (Tx) terminal (e.g., pin), and a connection state. However, this is only an example, and the communication cable may be realized as other various cables such as an RJ 45 cable, a USB cable, etc.

The controller 130 controls overall operations of the display apparatus 100. In particular, if it is determined that another display apparatus is connected through the communicator 120, the controller 130 may control the communicator 120 to generate an ID of the other display apparatus based on the ID information of the display apparatus 100, and to transmit an ID setting command including the ID information of the other display apparatus to the other display apparatus.

Figure 5:
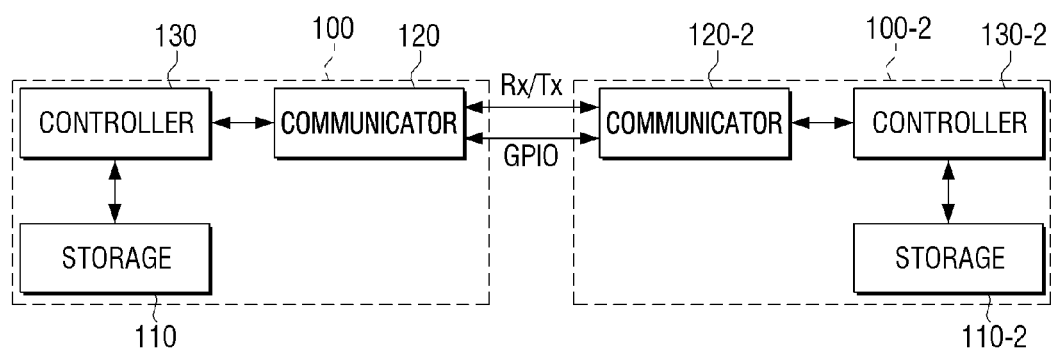
FIG. 5 is a view provided to explain a communication method using an RS 232 communication cable according to an exemplary embodiment.

Specifically, as illustrated in FIG. 5, if the communicator 120 of the display apparatus 100 is connected to a communicator 120-2 of another display apparatus 100-2, the controller 130 of the display apparatus 100 may determine whether the other display apparatus 100-2 is connected by using a change in the voltage level of the GPIO terminal. Specifically, in response to the voltage level of the GPIO terminal being a first predetermined value (for example, 10V), the controller 130 of the display apparatus 100 may determine that the other display apparatus 100-2 is not connected, and in response to the voltage level of the GPIO terminal being a second predetermined value (for example, 0V), the controller 130 of the display apparatus 100 may determine that the other display apparatus 100-2 is connected.

If it is determined that the other display apparatus 100-2 is connected, the controller 130 may generate an ID of the other display apparatus 100-2 using an ID stored in the storage 110. In this case, if the ID is a number, the controller 130 may generate an ID of the other display apparatus 100-2 by adding a predetermined value (for example, '1') to the pre-stored ID. For example, if the ID of the display apparatus 100 is '0', the controller 130 may generate '1' as the ID of the other display apparatus 100-2 by adding '1' to the ID of the display apparatus 100-1.

Meanwhile, in the present exemplary embodiment, the ID is a number. However, it is understood that this is only an example, and one or more other exemplary embodiments are not limited thereto. For example, the ID may be a text or a special text. In this case, the controller 130 may set an ID of the other display apparatus 100-2 such that the ID of the other display apparatus 100-2 is not the same as the stored ID of the display apparatus 100. For example, if the ID is a letter and the pre-stored ID of the display apparatus 100 is 'a', the controller 130 may set 'b,' which is the next letter of the pre-stored ID, as the ID of the other display apparatus 100-2. Furthermore, it is understood that in one or more other exemplary embodiments, the ID of the other display apparatus 100-2 may not be determined based on the ID of the display apparatus 100 (e.g., as a next letter or number), and may be determined in any way so as to be different from the IDs of other connected display apparatuses.

In addition, the controller 130 may control the communicator 120 to transmit an ID setting command including the ID information of the other display apparatus 100-2 by using the transmission (Tx) terminal of the communication cable.

A controller 130-2 of the other display apparatus 100-2 may receive the ID setting command through the receiver (Rx) terminal of the communication cable, set an ID based on the ID setting command, and store the ID in the storage 110-2. In addition, the controller 130-2 of the other display apparatus 100-2 may transmit the result of the ID setting change using the transmission (Tx) terminal of the communication cable.

As described above, by setting an ID of another display apparatus automatically through the connection of a communication cable, a user may set the ID of the display apparatus more conveniently.

Figure 6:
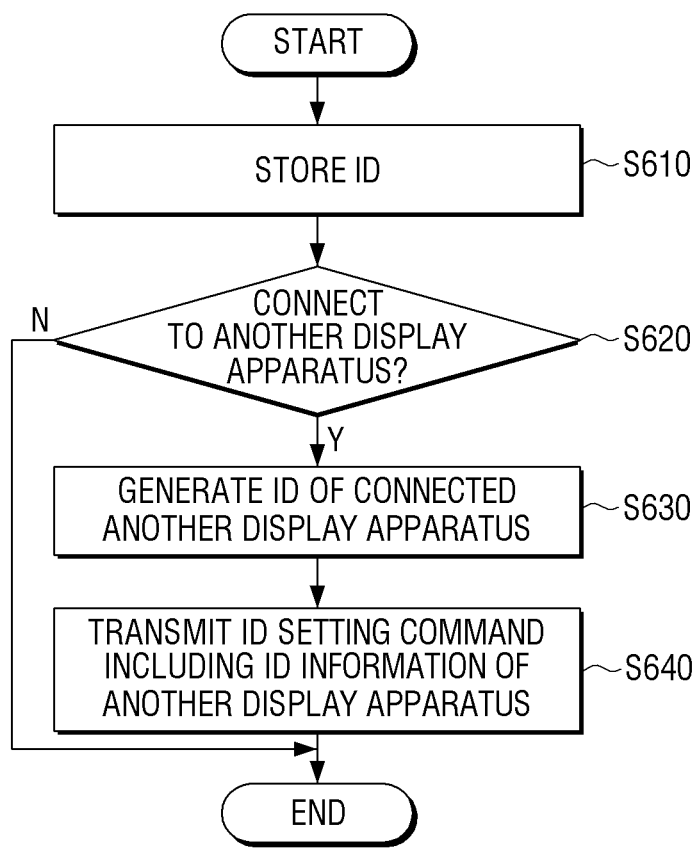
FIG. 6 is a flowchart provided to explain a method for setting an ID of a display apparatus according to an exemplary embodiment.

Hereinafter, an exemplary embodiment will be described in greater detail with reference to FIGS. 6 and 7. FIG. 6 is a flowchart provided to explain a method for setting an ID of a display apparatus according to an exemplary embodiment.

Referring to FIG. 6, the display apparatus 100 stores an ID (operation S610). In this case, the stored ID may be set by the previously-connected display apparatus 100, but this is only an example and it is understood that one or more other exemplary embodiments are not limited thereto. For example, according to another exemplary embodiment, the ID may be set by a user.

The display apparatus 100 determines whether another display apparatus is connected (operation S620). In this case, the display apparatus 100 may be connected to the other display apparatus through a communication cable, and may determine whether the other display apparatus is connected through a change in the voltage level of the GPIO terminal of the communication cable.

If it is determined that the other display apparatus is connected (operation S620-Y), the display apparatus 100 generates an ID of the connected other display apparatus (operation S630). In this case, the display apparatus 100 may generate the ID of the other display apparatus such that the ID of the other display apparatus is different from the pre-stored ID.

Subsequently, the display apparatus 100 transmits an ID setting command including the ID information of the other display apparatus to the other display apparatus (operation S640). The other display apparatus may set its ID through the ID setting command.

Figure 7:
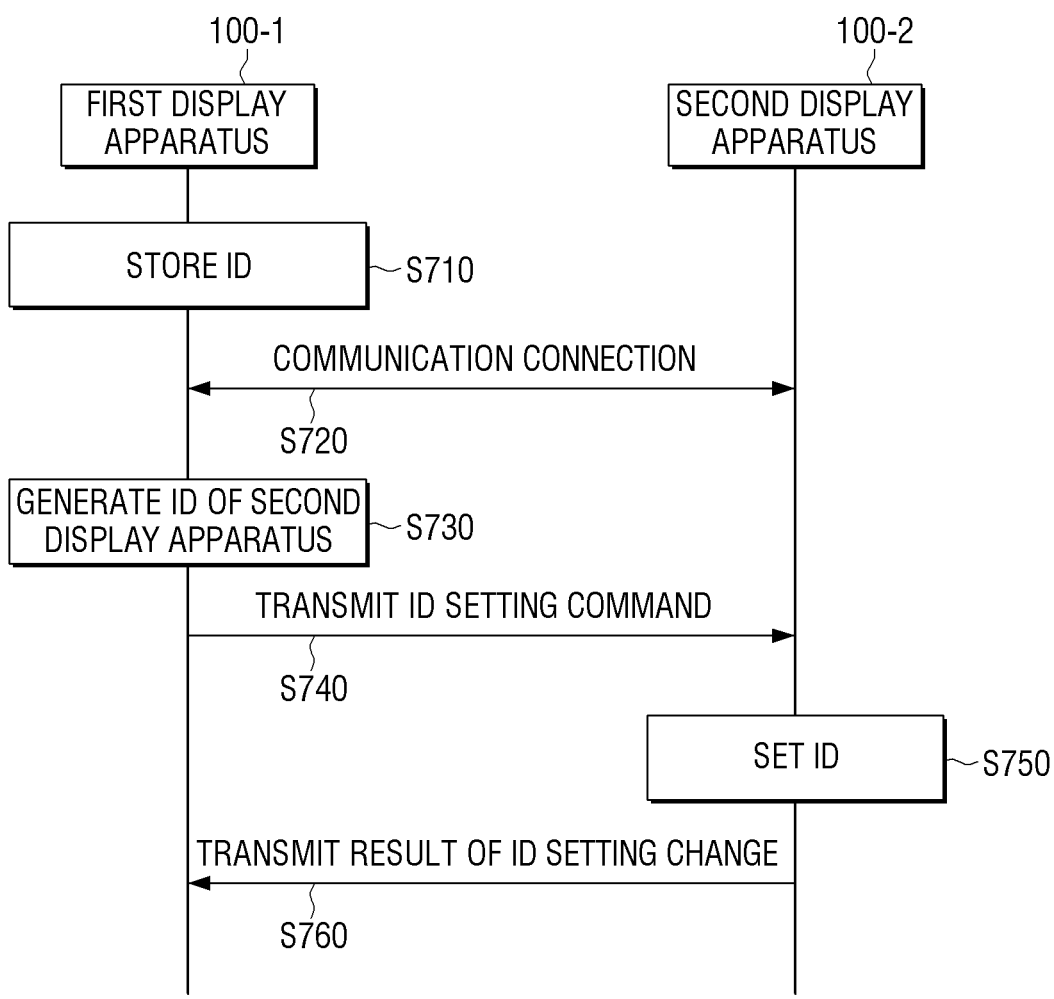
FIG. 7 is a sequence view provided to explain a method for setting an ID of a display system according to an exemplary embodiment.

FIG. 7 is a sequence view provided to explain a method for setting an ID of a display system according to an exemplary embodiment.

Referring to FIG. 7, the first display apparatus 100-1 stores an ID (operation S710).

Subsequently, the first display apparatus 100-1 performs a communication connection with the second display apparatus 100-2 (operation S720). In this case, the first display apparatus 100-1 may perform a communication connection with the second display apparatus 100-2 using a communication cable, and may determine whether another display apparatus is connected through a change in the voltage level of the GPIO terminal of the communication cable.

The first display apparatus 100-1 generates an ID of the second display apparatus 100-2 based on a pre-stored ID (operation S730).

The first display apparatus 100-1 transmits an ID setting command including the generated ID information of the second display apparatus 100-2 to the second display apparatus 100-2 (operation S740).

Subsequently, the second display apparatus 100-2 sets an ID based on the ID setting command (operation S750). The second display apparatus 100-2 stores the set ID, and transmits a result of the ID setting change to the first display apparatus 100-1 (operation S760).

By using the above-described display system 10, a user may set an ID of each of a plurality of display apparatuses more easily and conveniently.

Meanwhile, the ID setting method according to various exemplary embodiments may be realized as a program and provided to a display apparatus or an input device. In particular, a program including a method for controlling a display apparatus may be stored in a non-transitory computer readable medium and provided therein.

The non-transitory recordable medium may be a medium which may store data semi-permanently rather than storing data for a short time such as a register, a cache, and a memory and may be readable by an apparatus. Specifically, the above-described various applications or programs may be stored in a non-transitory readable medium, such as CD, DVD, hard disk, Blu-ray disk, USB, memory card, ROM, etc., and provided therein. Furthermore, it is understood that one or more of the above-described components may be implemented by or as circuitry, a processor, a microprocessor, etc.

The foregoing exemplary embodiments and advantages are merely exemplary and are not to be construed as limiting the present inventive concept. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A method of setting an identifier (ID) for a display system including a plurality of display apparatuses, the method comprising:

determining, by a first display apparatus from among the plurality of display apparatuses of the display system, whether a second display apparatus from among the plurality of display apparatuses is connected to the first display apparatus;

in response to determining that the second display apparatus is connected to the first display apparatus, generating, by the first display apparatus, an ID of the second display apparatus based on a set ID by the first display apparatus; and transmitting, from the first display apparatus to the second display apparatus, an ID setting command including the generated ID of the second display apparatus, wherein the ID setting command is to set an image quality of the second display apparatus to be the same as an image quality of the first display apparatus.

2. The method as claimed in claim 1, wherein:
the first display apparatus and the second display apparatus are connected via a communication cable; and
the communication cable includes a General-purpose input/output (GPIO) terminal which determines a receiver (Rx) terminal, a transmission (Tx) terminal, and a connection state.

3. The method as claimed in claim 2, wherein the determining whether the second display apparatus is connected comprises determining a connection state between the first display apparatus and the second display apparatus according to a change in a voltage level of the GPIO terminal.

4. The method as claimed in claim 2, wherein the transmitting comprises transmitting, by the first display apparatus, the ID setting command using the transmission (Tx) terminal of the communication cable.

5. The method as claimed in claim 2, further comprising:
setting, by the second display apparatus, an ID based on the ID setting command; and
transmitting, by the second display apparatus, a result of the setting to the first display apparatus using the transmission (Tx) terminal of the communication cable.

6. The method as claimed in claim 2, wherein the communication cable is one of a radio sector (RS) 232 cable and a registered jack (RJ) 45 cable.

7. The method as claimed in claim 1, further comprising:
in response to determining that a third display apparatus from among the plurality of display apparatuses is connected to the second display apparatus, generating, by the second display apparatus, an ID of the third display apparatus based on the ID for the second display apparatus; and
transmitting, from the second display apparatus to the third display apparatus, a third display apparatus ID setting command including the generated ID of the third display apparatus,
wherein the ID setting command is to set an image quality of the second display apparatus to be the same as an image quality of the first display apparatus.

8. The method as claimed in claim 1, further comprising:
receiving, by the first display apparatus from a fourth display apparatus connected thereto, a first display apparatus ID setting command for the first display apparatus; and
setting, by the first display apparatus, the ID for the first display apparatus based on ID information included in the first display apparatus ID setting command.

9. The method as claimed in claim 8, wherein the receiving comprises, in response to a connection between the first display apparatus and the fourth display apparatus, receiving, by the first display apparatus from the fourth display apparatus, the first display apparatus ID setting command.

10. A non-transitory computer readable recording medium having recorded thereon a program executable by a computer for performing the method of claim 1.

11. A display apparatus, comprising:
a storage configured to store an ID of the display apparatus;
a communicator configured to perform communication with another display apparatus; and
a controller configured to, in response to determining that other display apparatus is connected through the communicator, control to generate an ID of the other display apparatus based on the stored ID of the display apparatus, and to control the communicator to transmit, to the other display apparatus, an ID setting command including the generated ID of the other display apparatus,
wherein the ID setting command is to set an image quality of the other display apparatus to be the same as an image quality of the display apparatus.

12. The display apparatus as claimed in claim 11, wherein:
the communicator performs the communication between the display apparatus and the other display apparatus via a communication cable; and
the communication cable includes a General-purpose input/output (GPIO) terminal which determines a receiver (Rx) terminal, a transmission (Tx) terminal and a connection state.

13. The display apparatus as claimed in claim 12, wherein the controller determines a connection state between the display apparatus and the other display apparatus using a change in a voltage level of the GPIO terminal.

14. The display apparatus as claimed in claim 12, wherein the controller controls the communicator to transmit the ID setting command using the transmission (Tx) terminal of the communication cable.

15. The display apparatus as claimed in claim 12, wherein the communicator, in response to the other display apparatus setting the generated ID based on the ID setting command, receives, from the other display apparatus, a result of the setting using the receiver (Rx) terminal of the communication cable.

16. The display system as claimed in claim 15, wherein:
the first display apparatus and the second display apparatus are connected via a communication cable; and
the communication cable is one of an RS 232 cable and an RJ 45 cable.

17. The display apparatus as claimed in claim 12, wherein the communication cable is one of an RS 232 cable and an RJ 45 cable.

18. The display apparatus as claimed in claim 11, wherein:
the communicator is configured to receive, from a third display apparatus connected thereto, ID information of the display apparatus; and
the controller is configured to set an ID of the display apparatus based on the received ID information of the display apparatus and to store the set ID in the storage.

19. A display system, comprising:
a first display apparatus configured to determine whether a second display apparatus is connected thereto, in response to determining that the second display apparatus is connected, to generate an ID of the second display apparatus based on predetermined ID information, and to transmit, to the second display apparatus, an ID setting command including the generated ID of the second display apparatus; and
a second display apparatus configured to set the ID based on the transmitted ID setting command, wherein the ID setting command is to set an image quality of the second display apparatus to be the same as an image quality of the first display apparatus.

* * * * *